United States Patent
Zhang (10) Patent No.: US 7,089,398 B2
(45) Date of Patent: Aug. 8, 2006

(54) ADDRESS TRANSLATION USING A PAGE SIZE TAG

(75) Inventor: David Zhang, San Jose, CA (US)

(73) Assignee: Silicon Graphics, Inc., Mountain View, CA (US)

(*) Notice: Subject to any disclaimer, the term of this patent is extended or adjusted under 35 U.S.C. 154(b) by 342 days.

(21) Appl. No.: 10/632,131

(22) Filed: Jul. 31, 2003

(65) Prior Publication Data

US 2005/0027961 A1 Feb. 3, 2005

(51) Int. Cl.
*G06F 12/06* (2006.01)

(52) U.S. Cl. ..................... 711/207; 711/220

(58) Field of Classification Search .............. None
See application file for complete search history.

(56) References Cited

U.S. PATENT DOCUMENTS 5,465,337 A * 11/1995 Kong .................... 711/207
5,895,501 A * 4/1999 Smith .................... 711/207

* cited by examiner

*Primary Examiner*—T. Nguyen
(74) *Attorney, Agent, or Firm*—Schwegman, Lundberg, Woessner & Kluth, P.A.

(57) ABSTRACT

A method and system for resolving virtual addresses using a page size tag are described herein. In one embodiment, the method comprises translating a virtual memory address into physical memory address. According to the method, the translating includes producing a first page size tag and choosing an entry in a translation lookaside buffer, wherein the entry stores a second page size tag and a page frame number. The method also includes comparing the first page size tag with the second page size tag. The method also includes using the page frame number to form the physical memory address, if the first page size tag is less than or equal to the second page size tag.

15 Claims, 9 Drawing Sheets

ADDRESS TRANSLATION USING A PAGE SIZE TAG

FIELD

This invention relates generally to the field of virtual addressing and particularly to resolving virtual addresses using a page size tag.

BACKGROUND

Typically, computers systems provide an address space that is much larger than the physical memory contained within the computer system. This larger address space is often referred to as virtual memory or virtual address space. The virtual address space is often divided into blocks called pages. For pages to be quickly accessible by application and system software, the pages must be loaded into the computer's physical memory. When pages are loaded into physical memory, they are mapped from the virtual address space into the physical address space (e.g. the address space available in random access memory and cache). Such address mapping is referred to as virtual address resolution. Often, the mapping information for a set of virtual memory addresses is stored in a fast memory called a translation lookaside buffer (TLB). Thus, TLBs facilitate quick mapping of virtual addresses to physical addresses.

Many computer systems allow different software programs to use different page sizes. For example, one software application may use a 16Kb page size, while another software application uses a 4Kb page size. Providing support for variable page sizes allows software to use physical memory more efficiently. For example, when software applications use page sizes that are too big, address space is wasted. Moreover, when software applications use page sizes that are too small, the TLB is very large; thus requiring a large area to accommodate the TLB. Therefore, for computer systems that support variable page sizes, there is a need for TLBs that efficiently store address mapping information for multiple page sizes.

SUMMARY

A method and system for resolving virtual addresses using a page size tag are described herein. In one embodiment, the method comprises translating a virtual memory address into a physical memory address. According to the method, the translating includes producing a first page size tag and choosing an entry in a translation lookaside buffer, wherein the entry stores a second page size tag and a page frame number. The method also includes comparing the first page size tag with the second page size tag. The method also includes using the page frame number to form the physical memory address, if the first page size tag is less than or equal to the second page size tag.

In one embodiment, the system comprises a random access memory (RAM) unit. The system also includes a processor coupled with the RAM unit. The processor includes a translation lookaside buffer. In one embodiment, the translation lookaside buffer (TLB) includes a plurality of entries, where the plurality of entries include a TLB page size tag field and a page frame number field.

BRIEF DESCRIPTION OF THE FIGURES

The present invention is illustrated by way of example and not limitation in the Figures of the accompanying drawings, in which like references indicate similar elements and in which.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment," "an embodiment," or "an alternative embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. It should be also be understood that some of the operations of the flow diagrams can be performed in a different order than that appearing in the flow diagrams.

Additionally, some of the operations of the flow diagrams can be performed in parallel with other operations of the flow diagrams.

This description of the embodiments is divided into three sections. In the first section, an exemplary hardware and operating environment is described. In the second section, a system level overview is presented. In the third section, an exemplary implementation is described.

Hardware and Operating Environment

This section provides an overview of the exemplary hardware and the operating environment in which embodiments of the invention can be practiced.

Figure 1:
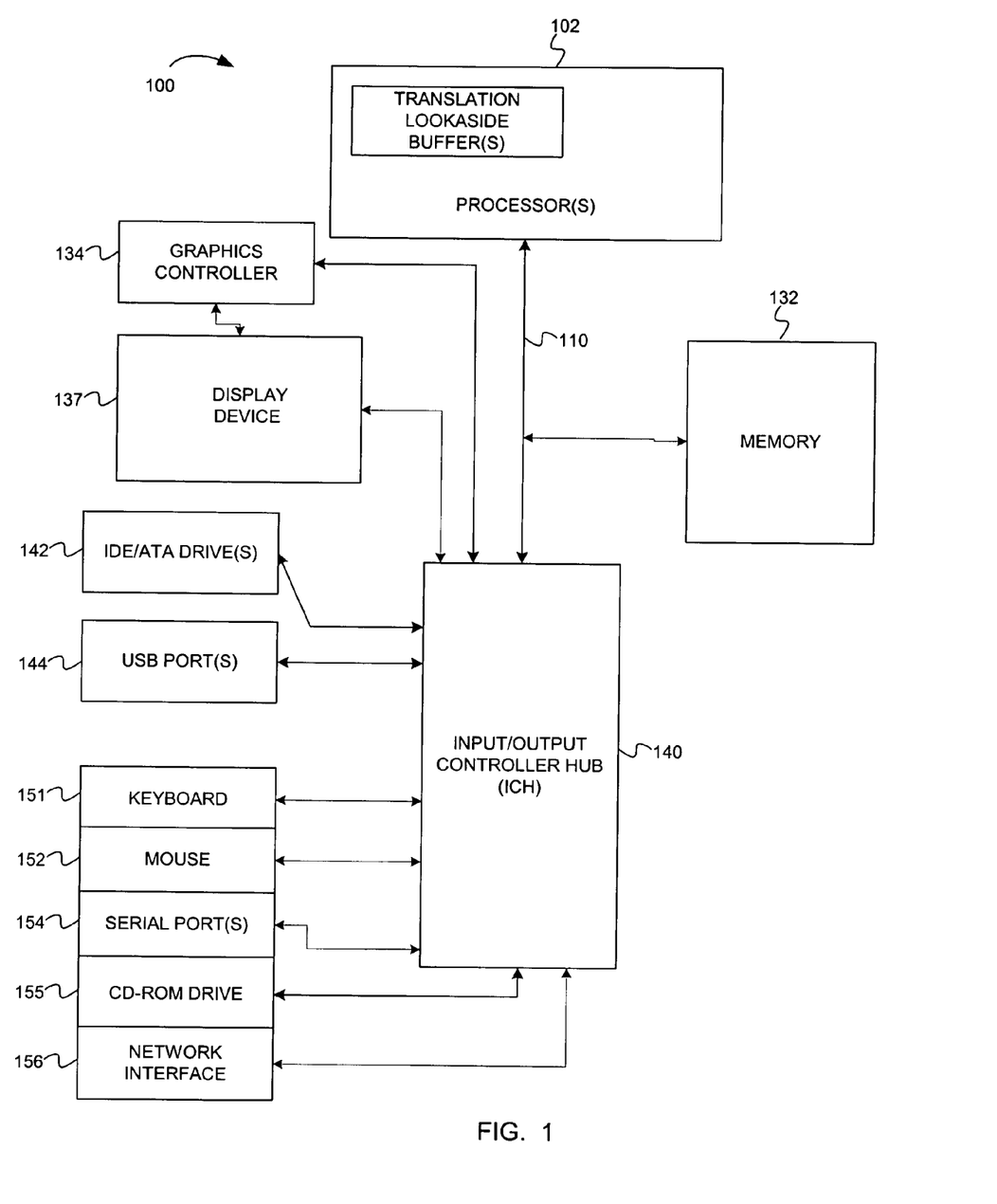
FIG. 1 illustrates an exemplary computer system used in conjunction with certain embodiments of the invention.

FIG. 1 illustrates an exemplary computer system used in conjunction with certain embodiments of the invention. As illustrated in FIG. 1, computer system 100 comprises processor(s) 102, which includes a translation lookaside buffer(s) (TLB). Computer system 100 also includes a memory 132, processor bus 110, and input/output controller hub (ICH) 140. The processor(s) 102, memory 132, and ICH 140 are coupled to the processor bus 110. The processor(s) 102 may comprise any suitable processor architecture. The computer system 100 may comprise one, two, three, or more processors, any of which may execute a set of instructions in accordance with embodiments of the present invention.

The memory 132 stores data and/or instructions, and may comprise any suitable memory, such as a dynamic random access memory (DRAM), for example. The computer system 100 also includes IDE drive(s) 142 and/or other suitable storage devices. A graphics controller 134 controls the display of information on a display device 137, according to embodiments of the invention.

The input/output controller hub (ICH) 140 provides an interface to I/O devices or peripheral components for the computer system 100. The ICH 140 may comprise any suitable interface controller to provide for any suitable communication link to the processor(s) 102, memory 132 and/or to any suitable device or component in communication with the ICH 140. For one embodiment of the invention, the ICH 140 provides suitable arbitration and buffering for each interface.

For one embodiment of the invention, the ICH 140 provides an interface to one or more suitable integrated drive electronics (IDE) drives 142, such as a hard disk drive (HDD) or compact disc read only memory (CD ROM) drive, or to suitable universal serial bus (USB) devices through one or more USB ports 144. For one embodiment, the ICH 140 also provides an interface to a keyboard 151, a mouse 152, a CD-ROM drive 155, and one or more suitable devices through one or more serial ports 154. For one embodiment of the invention, the ICH 140 also provides a network interface 156 though which the computer system 100 can communicate with other computers and/or devices. In one embodiment, the computer system 100 includes a machine-readable medium that stores a set of instructions (e.g., software) embodying any one, or all, of the methodologies described herein. Furthermore, software can reside, completely or at least partially, within memory 132 and/or within the processor(s) 102.

System Level Overview

Figure 2:
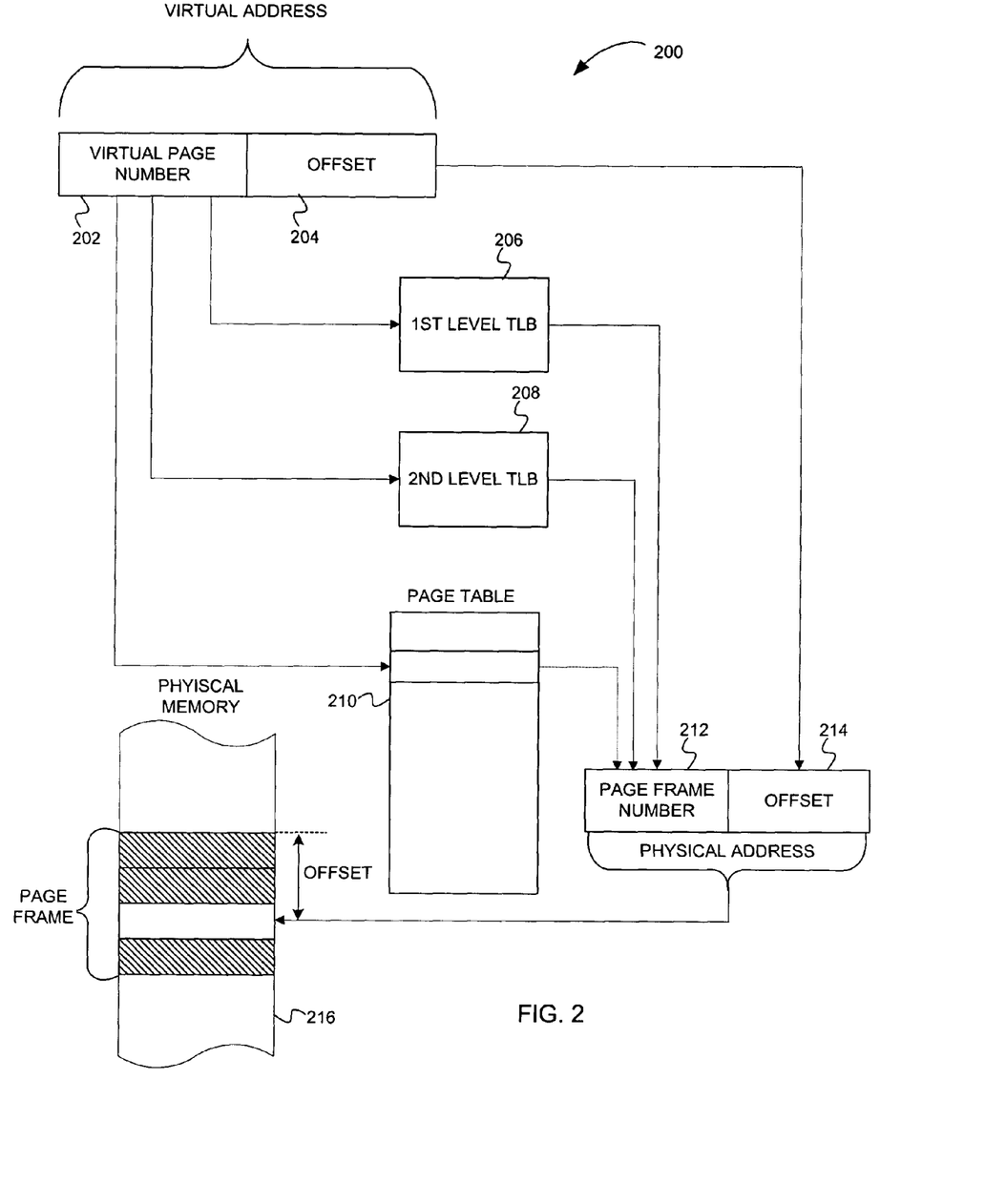
FIG. 2 is a block diagram illustrating a system for resolving virtual addresses, according to embodiments of the invention.
Figure 3:
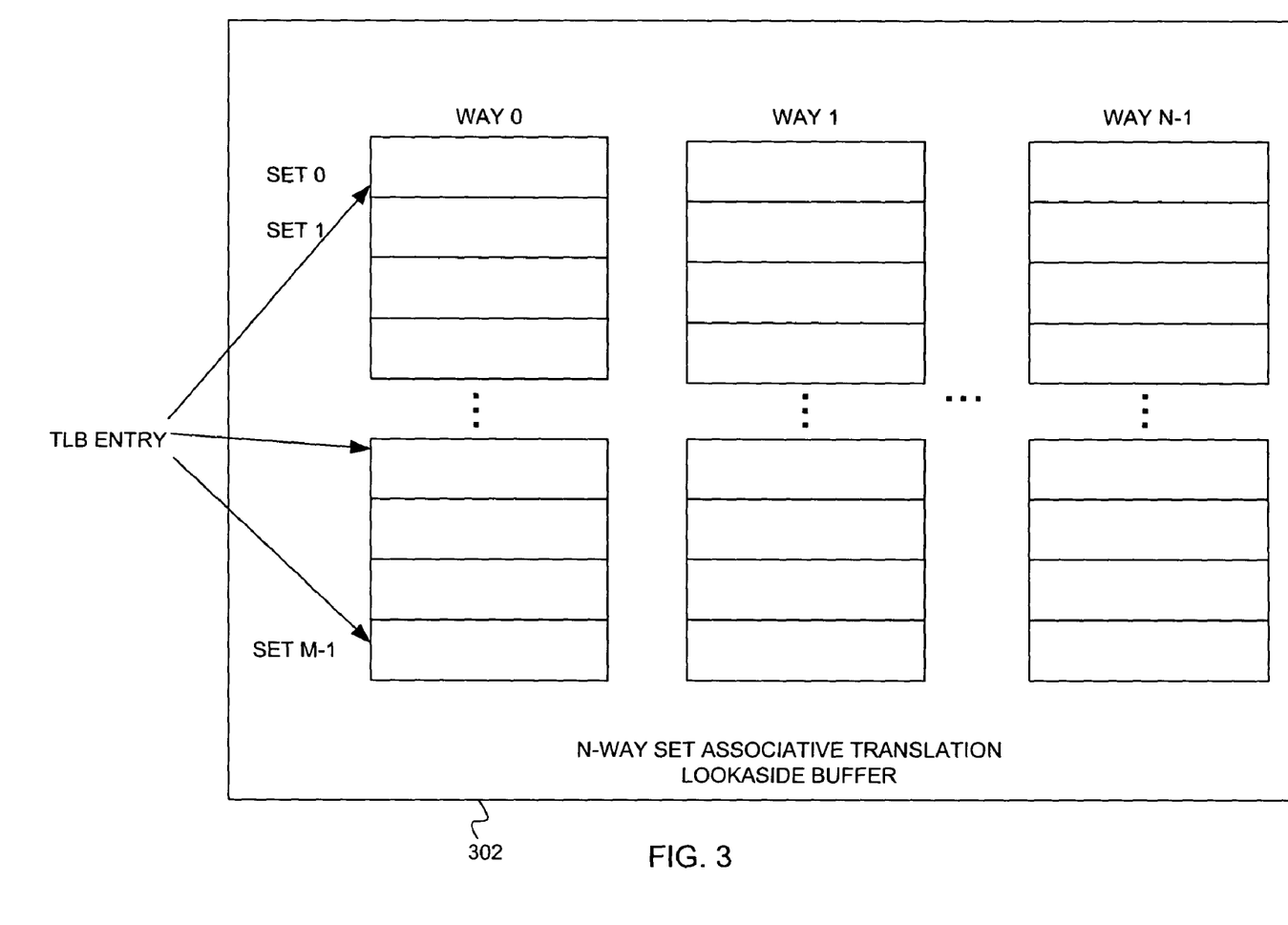
FIG. 3 is a block diagram illustrating an N-way set associative translation lookaside buffer, according to embodiments of the invention.

This section provides a system level overview of exemplary embodiments of the invention. FIGS. 2–3 describe an architecture and data flow between processor units of a virtual memory system. In particular, FIG. 2 describes resolving virtual memory addresses, while FIG. 3 describes an N-way set associative translation lookaside buffer.

FIG. 2 is a block diagram illustrating a system for resolving virtual addresses, according to embodiments of the invention. As shown in FIG. 2, the virtual address resolution system 200 includes a first level TLB 206, a second level TLB 208, a page table 210, and a physical memory 216. As shown in FIG. 2, a virtual address includes a virtual page number 202 and an offset 204. The virtual page number 202 is transmitted to the first level TLB 206, which attempts to match the virtual page number 202 with a virtual page number (not shown) stored in the first level TLB 206. In one embodiment, the first level TLB 206 is an N-way set associative TLB, as described below with reference to FIG. 3. If the first level TLB 206 finds an entry containing a virtual page number matching the virtual page number 202, the first level TLB 206 provides a page frame number 212 corresponding to the virtual page number 202. The virtual page number 202 is also transmitted to a second level TLB 208, which attempts to match the virtual page number 202 with a virtual page number (not shown) stored in the second level TLB 208. If the second level TLB 208 finds an entry containing a virtual page number matching the virtual page number 202, the second level TLB 208 provides the page frame 212 number corresponding to the virtual page 202.

Although not shown in FIG. 2, the first level TLB 206 includes faster matching logic than the second level TLB 208, which includes faster logic than the page table 210. The matching operations are performed in parallel to minimize delays associated with resolving virtual addresses. That is, if the required physical address information (i.e., the corresponding page frame number 212) is not in the first level TLB 206, operations for fetching the physical address information from the second level TLB 208 and the page table 210 are performed in parallel to minimize latency associated virtual address resolution. In one embodiment, the second level TLB 208 is also an N-way set associative TLB, as described below with reference to FIG. 3. In one embodiment, if a match is not found in either of the TLBs, the virtual address resolution system 200 fetches the corresponding page frame number 212 from the page table 210 and loads it into one or both of the TLBs (see discussion of TLB exceptions in the next section).

Once the page frame number 212 is fetched from either of the TLBs or the page table 210, it is combined with the offset 214 to the form a physical address. As shown in FIG. 2, the page frame number 212 is used to address a page in the physical memory 216. The offset 214 is used to access and address relative to the beginning of the page.

FIG. 3 is a block diagram illustrating an N-way set associative translation lookaside buffer, according to embodiments of the invention. As shown in FIG. 3, the N-way set associative TLB 302 includes ways 0 to N−1 and sets 0 to M−1. Each set includes N TLB entries, one TLB entry corresponding to each way, for a total of N TLB entries per set. As noted above, either or both TLBs of FIG. 2 can be N-way set associative TLBs. Each TLB entry holds virtual address information, as described in more detail with reference to FIG. 4.

Exemplary Implementation

Figure 4A:
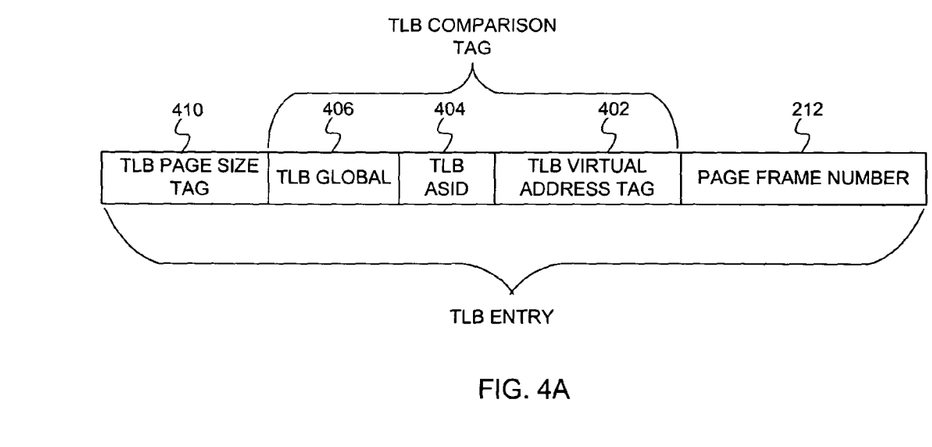
FIG. 4A is a block diagram illustrating the layout of a translation lookaside buffer entry, according to embodiments of the invention.

FIG. 4A is a block diagram illustrating the fields of a translation lookaside buffer entry, according to embodiments of the invention. As shown in FIG. 4A, the TLB entry includes a page frame number 212, TLB virtual address tag 402, TLB application specific identifier 404 (illustrated as TLB ASID), TLB global field 406 (illustrated as TLB GLOBAL), and a TLB page size tag 408. As indicated above, the page frame number 212 is combined with an offset to address a location in physical memory. The TLB virtual address tag 402 is a portion of a virtual address that is stored in the TLB and used to resolve a virtual address. The TLB application specific identifier (ASID) 404 is an identifier indicating which processes have access to a virtual memory address. The TLB global field 406 is an identifier for indicating that a virtual memory address is accessible by all processes. The TLB page size tag 408 indicates a page size. In one embodiment, the page size is represented in four bits, which are stored in the page size tag 408. The use of these TLB entry fields will be described below with reference to FIGS. 5–9. In addition to the fields shown in FIG. 4A, embodiments of the invention include additional fields. For example, in one embodiment, the TLB entry includes a read permissions field, a write permissions field, and a valid field. In an alternative embodiment, the TLB entry includes a use field and a dirty field. In one embodiment, the TLB entry includes an invalid field to indicate whether the contents of the TLB entry can be used for resolving the virtual address. According to alternative embodiments, the TLB entry includes other suitable fields for mapping virtual addresses into the physical address space.

Figure 4B:
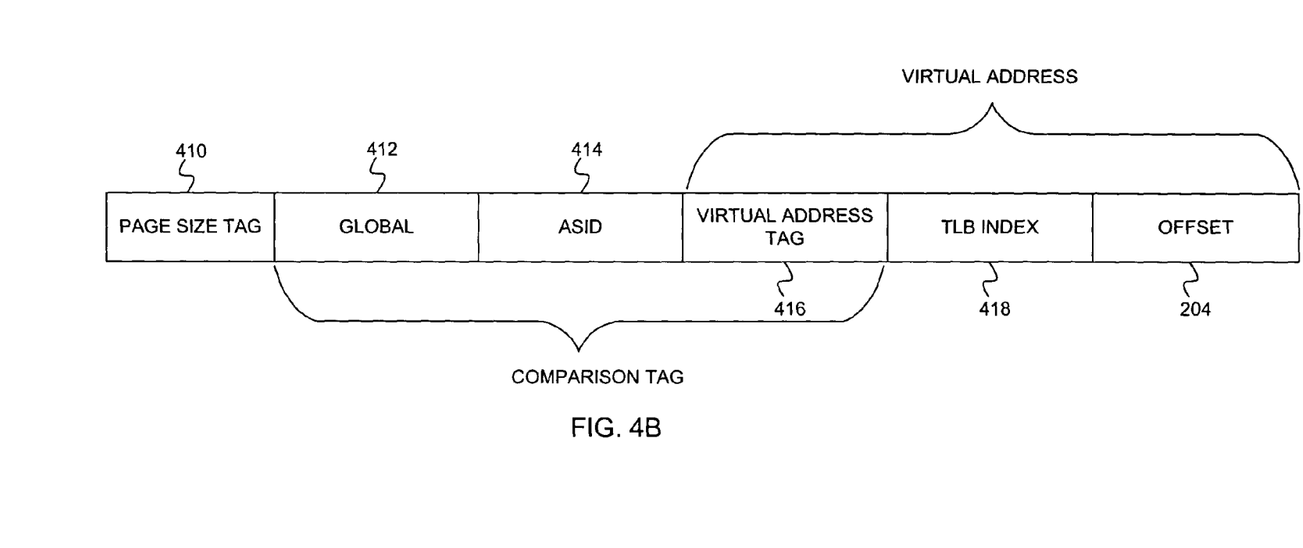
FIG. 4B is a block diagram illustrating data fields used for resolving virtual memory addresses, according to embodiments of the invention.

FIG. 4B is a block diagram illustrating data fields used for resolving virtual memory addresses, according to embodiments of the invention. As shown in FIG. 4B, the data fields used for resolving a virtual address include a page size tag 410, global field 412, application specific identifier (ASID) 414, virtual address tag 416, index 418, and offset 204. The page size tag 410 is similar to the TLB page size tag, as it indicates a page size associated with a virtual memory address and software that has access to the virtual memory address. However, the page size tag 410 is not stored in the TLB 208. The global field 412 is similar to the TLB global field 406, as it indicates that a virtual memory address is accessible by all software applications. However, the global field 412 is not stored in the TLB 208.

Figure 5:
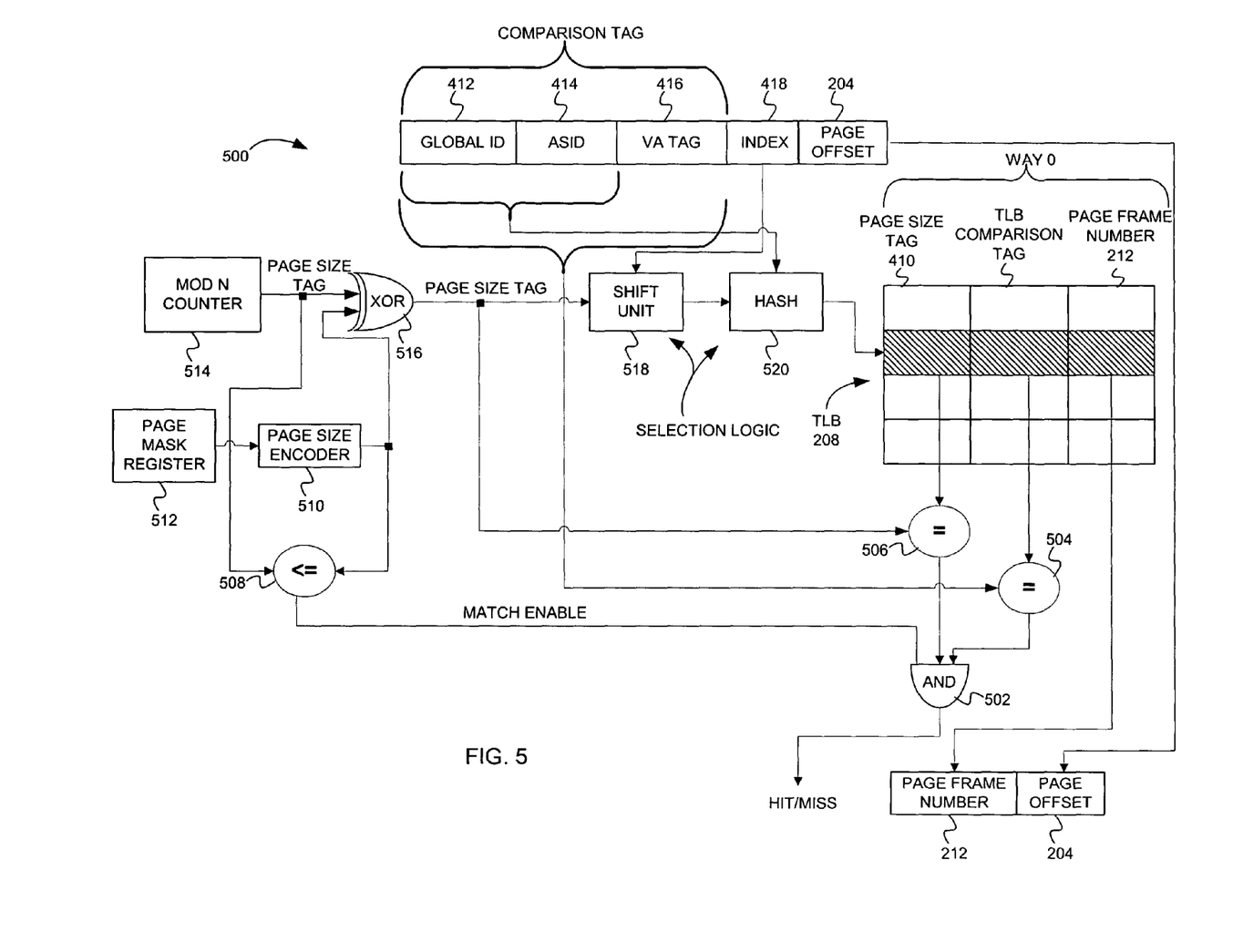
FIG. 5 is a block diagram illustrating logic for resolving a virtual address, according to embodiments of the invention.

The ASID 414 indicates that a virtual memory address is accessible by particular processes, while the index 418 is used to determine an index into the TLB 208. The ASID 414 and virtual address tag 416 differ from the TLB ASID 404 and TLB virtual address tag 402 because they are not stored in the TLB 208. As described above, the offset 204 is combined with the page frame number 212 to form a physical address (see the discussion of FIG. 2 above). Additionally, as shown in FIG. 4B, the virtual address tag 416, index 418, and offset 204 make up a virtual address. The global ID 412, ASID 14, and virtual address tag 416 make up a comparison tag, which is described below in the discussion of FIG. 5. As shown in FIG. 5, the TLB global field 412, TLB ASID 404, and TLB virtual address tag make up a TLB comparison tag.

It should be understood that the TLB data fields (e.g., the TLB page size tag 408, TLB global ID 406, etc.) could hold the same values as their non-TLB counterparts (e.g., the page size tag 410, global ID 412, etc.). For example, the TLB page size tag 408 may contain a particular four-bit character string, while the page size tag 410 contains a matching four-bit character string.

While FIGS. 4A and 4B describe data fields used for resolving a virtual address, FIGS. 5–9 describe an architecture and operations for converting a virtual address into a physical address. In particular, FIGS. 5 and 8 describe logic for resolving virtual addresses, while FIGS. 6, 7, and 9 describe operations for resolving virtual addresses.

FIG. 5 is a block diagram illustrating logic for resolving a virtual address, according to embodiments of the invention. As shown in FIG. 5, the global ID 412, ASID 414, virtual address tag 416, index 418, and offset 204 are used for resolving a virtual address. As also shown in FIG. 5, the logic 500 includes a page mask register 512 is connected to a page size encoder 510, which is connected to a comparator 508 and an exclusive-or gate 516. The comparator 508 is connected to a mod N counter 514, which is also connected to the exclusive-or gate 516. The exclusive-or gate 516 is connected to a comparator 506 and a shift unit 518, which is connected to a hash unit 520. The hash unit 520 is connected to a TLB 208. The hash unit 520 and the shift unit 518 make up selection logic that selects a set in the TLB 208, as described below. As shown in FIG. 5, the TLB 208 includes way 0, which includes three columns. The leftmost column entries include TLB page size tags 410, while the middle column entries include fields comprising the TLB comparison tag, and the rightmost column entries include page frame numbers 212. As noted above, alternative embodiments of the invention include additional fields (e.g., read and write permissions fields etc.). Each of the entries in the leftmost column is connected to the comparator 506. Similarly, each of the entries in the middle column is connected to a comparator 504. Comparators 506 and 504 are connected with an and-gate 502. Each of the entries in the rightmost column is connected to a storage location designated to receive the page frame number 212. In one embodiment, storage location resides in a load/store unit (not shown) in the processor(s) 102. In an alternative embodiment, there is a plurality of locations for receiving the page frame number 212.

In FIG. 5, only a portion of the TLB 208 is shown, so as not to obscure details of embodiments of the invention. Although they are not depicted in FIG. 5, similar connectivities and similar functionality are included for each way of the TLB 208. For example, the hash unit 520 is connected with ways 1 through N–1. Moreover, the exclusive-or gate 516 is connected to comparators for ways 1 through N–1 in the same fashion that it is connected to comparator 506 for way 0.

Figure 6:
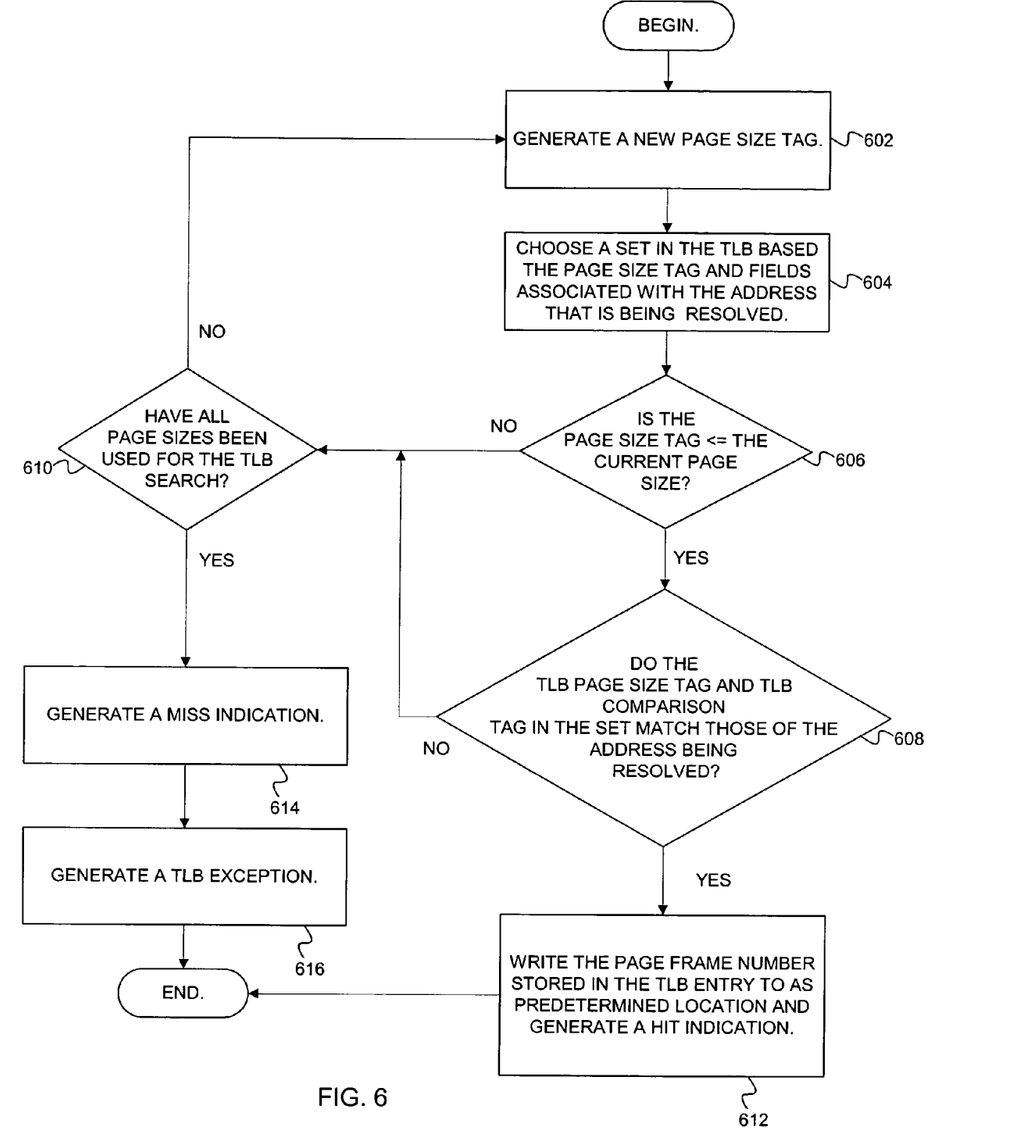
FIG. 6 is a flow diagram illustrating operations for resolving a virtual memory address using a page size tag stored in a TLB, according to exemplary embodiments of the invention.

FIG. 6 is a flow diagram illustrating operations for resolving a virtual memory address using a page size tag stored in a TLB, according to exemplary embodiments of the invention. The operations of the flow diagram 600 will be described with reference to the logic illustrated in FIG. 5. The flow diagram 600 commences at block 602.

At block 602, a new page size tag is generated. For example, the logic 500 creates a page size tag 410 based on information contained in the page mask register 512, an encoding method performed by the page size encoder 510, and signals produced processed by the mod N counter 514 and exclusive-or gate 516. In one embodiment, the page size encoder 510 encodes the contents of the page mask register 512 into a 4-bit string. In one embodiment, the page size tag indicates a page size such as 4Kb, 8Kb, 16Kb, etc. The process continues at block 604.

As shown in block 604, a set in the TLB is chosen based on the page size tag and fields associated with the address that is being resolved. For example, the exclusive-or gate 516 transmits the page size tag 410 to the shift unit 518. The shift unit 518 also receives the page size tag 408 and the index 418. Based on the page size tag 410, the shift unit 518 configures the index 418 to a size corresponding to the current page size. The shift unit 518 transmits the configured index 418 to the hash unit 520, which also receives a global ID 412 and an ASID 414. The hash unit 520 uses the global ID 412, ASID 414, and index 418 to choose a set in way 0 (and other ways) of the TLB 208. The process continues at block 606.

At block 606, it is determined whether the page size tag is less than or equal to the current page size. For example, the comparator 508 compares the current page size to the page size tag. In one embodiment, the comparator 508 receives the current page size from the page size encoder 510, while also receiving a page size tag from the mod N counter 514. If the page size tag is less than or equal to the current page size, the process continues at block 608. Otherwise, the process continues at block 610.

At block 608, it is determined whether the TLB page size tag and TLB comparison tag match the page size tag and comparison tag, respectively. For example, the comparator 506 compares the TLB page size tag 408 with the page size tag 410. Also, the comparator 504 compares the TLB comparison tag with the comparison tag. If the tags match, the process continues at block 612. Otherwise, the process continues at block 608.

As shown in block 612, the page frame number stored in the TLB entry is transmitted to a predetermined storage location and a hit indication is generated. For example, the TLB 208 transmits the page frame number 212 to a predetermined storage location. In one embodiment, the predetermined storage location is a load store unit (not shown). Additionally, the and-gate 502 generates a hit indication. In one embodiment, the hit indication indicates that a page frame number 212 has been transmitted to the predetermined storage location. From block 612, the process ends.

At block 610, it is determined whether all page sizes have been used in the TLB search. For example, the mod N counter 514 determines whether a page size tag 410 corresponding to each of the supported page sizes has been used to search the TLB 208 for a TLB comparison tag that matches the comparison tag. If all page sizes have been used in the search, the process continues at block 602. Otherwise the process continues at block 614.

As shown in block 614, a miss indication is generated. For example, the and-gate 502 generates a miss indication. In one embodiment, the miss indication indicates that the comparison tag did not match TLB comparison tag and/or the page size tag 410 did not match the TLB page size tag 408 and/or the current page size is greater than the page size tag 410. The process continues at block 616.

At block 616, a TLB exception is generated. For example, the miss indication causes logic (not shown) in the processor 102 to generate a TLB exception. Operations for responding to a TLB exception are described below in the discussion of FIG. 7. From block 616, the process ends.

Figure 7:
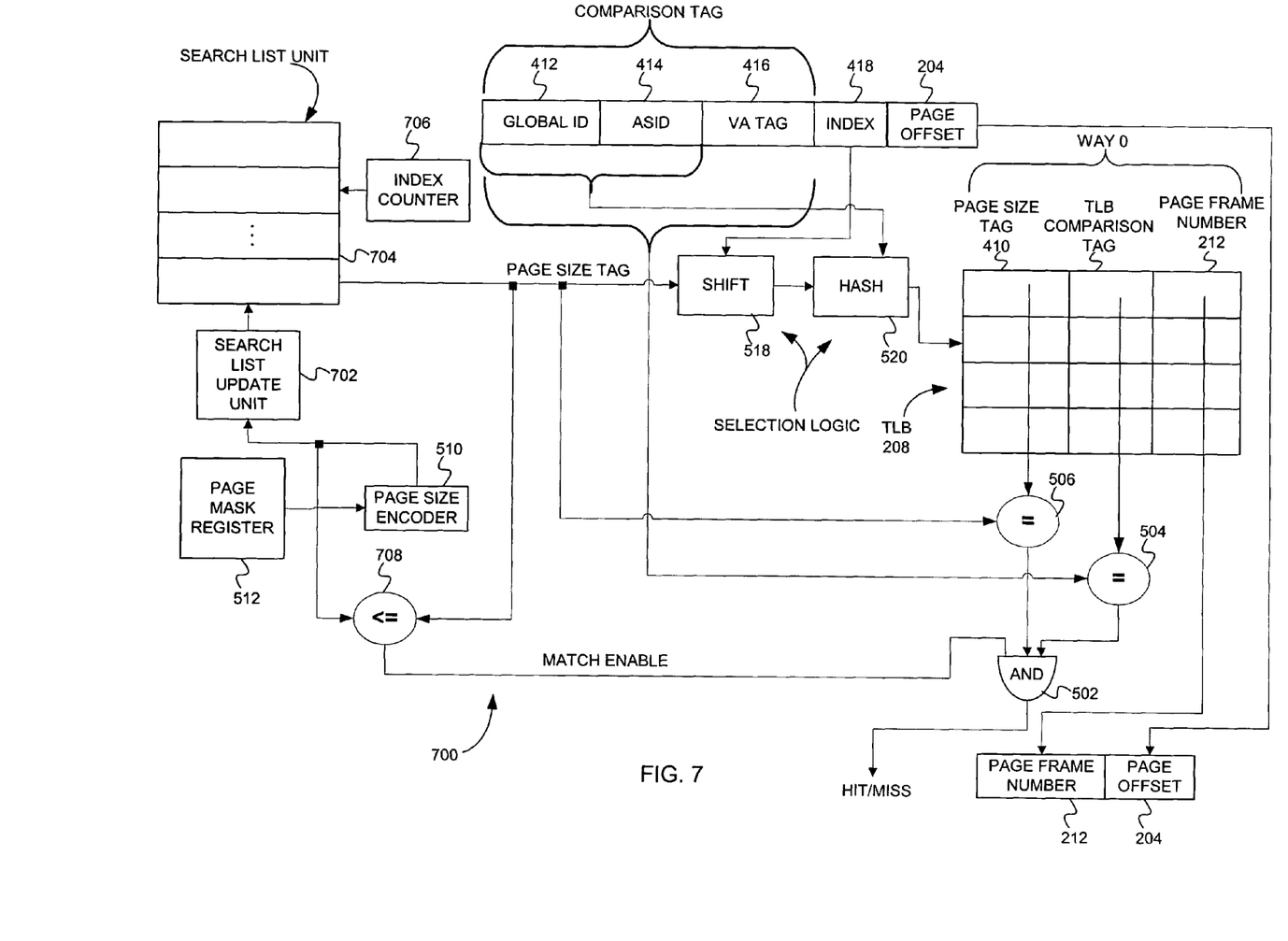
FIG. 7 is a block diagram illustrating logic for resolving a virtual address using a search order list.
Figure 8:
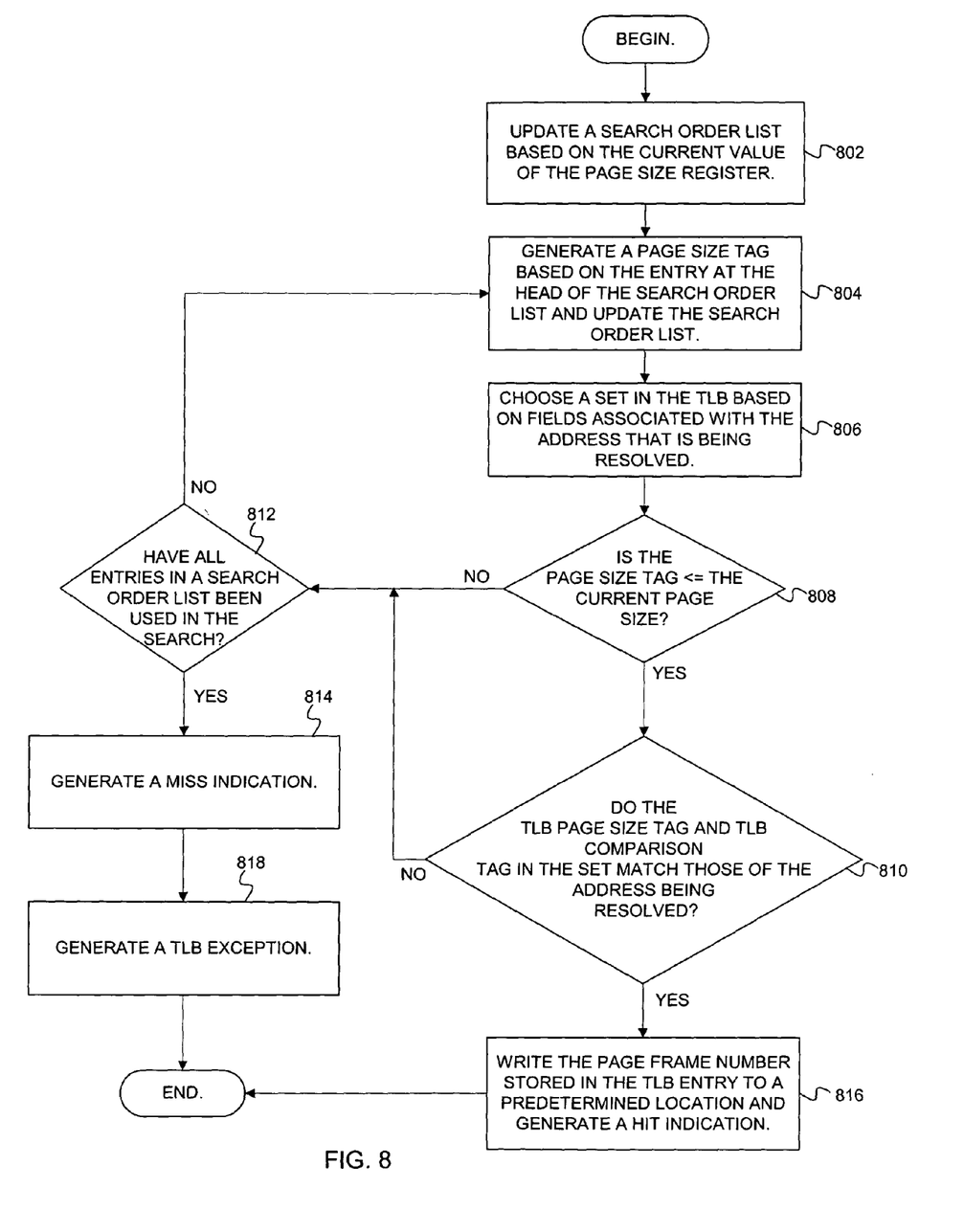
FIG. 8 is a flow diagram illustrating operations for resolving a virtual address using a search order list.

While FIGS. 5 and 6 describe resolving a virtual address using a page size tag stored in the TLB, FIGS. 7 and 8 describe resolving a virtual address using a TLB page size tag and a search list.

FIG. 7 is a block diagram illustrating logic for resolving a virtual address using a search list. As shown in FIG. 7, a global ID 412, ASID 414, virtual address tag 416, index 418, and offset 204 are used by the logic 700 for resolving a virtual address. As also shown in FIG. 7, a page mask register 512 is connected to a page size encoder 510, which is connected to a search list update unit 702. In one embodiment, the page mask register 512 holds a value representing the page size associated with the address being resolved.

The page size encoder 510 is also connected to a less-than-or-equal-to comparator 708. The search list update unit 702 is connected to a search list unit 704, which is connected to an index counter 706 and the less-than-or-equal-to comparator 708. The search list unit 704 is also connected to a comparator 506 and shift unit 518, which is connected to a hash unit 520. The shift unit 518 receives the index 418. In one embodiment, the search list unit 704 contains a list of page size tags. In one embodiment, the search list unit 704 generates page size tags 410 according to a predetermined policy. For example, in one embodiment, the search list unit 704 generates page size tags based on a least recently used policy (LRU). In one embodiment, the search list update unit 702 orders the search list according to the predetermined policy (e.g., LRU). Other embodiments use other suitable search policies.

The hash unit 520, which receives the global ID 412 and the ASID 414, is connected to a TLB 208. As shown in FIG. 7, way 0 includes three columns. The leftmost column entries include TLB page size tags 410, while the middle column entries include TLB comparison tags, each of which includes fields corresponding to the comparison tag. The rightmost column entries include TLB page frame numbers 212. As noted above, alternative embodiments of the invention include additional fields (e.g., read and write permissions fields etc.). Each of the entries in the leftmost column is connected to the comparator 506. Similarly, each of the entries in the middle column is connected to a comparator 504. Comparators 506 and 504 are connected with an and-gate 502. Each of the entries in the rightmost column is connected to a storage location designated to receive page frame numbers 212. In one embodiment, the storage location resides in a load/store unit (not shown). In an alternative embodiment, there is a plurality of storage locations for receiving the page frame number 212.

FIG. 8 is a flow diagram illustrating operations for resolving a virtual address using a search list. The operations of the flow diagram 800 will be described with reference to the exemplary logic of FIG. 7. The flow diagram 800 commences a block 802.

At block 802, a search list is updated based on the current page size. For example, the search list update unit 702 reorders the search list unit 704 based on the value contained in the page mask register 512. In one embodiment, the search list update unit 702 places the least recently used page size tag at the head of the search list. In one embodiment, the page size tag 410 at the head of the list is the next page size tag generated by the search list unit 704. The process continues at block 804.

As shown in block 804, a page size tag is generated based on the entries at the head of the search list and the search list is updated. For example, the search list unit 704 transmits a page size tag 410 to the shift unit 518 and the comparator 504. The search list update unit 702 updates the search list. In one embodiment, after the search list unit generates the page size tag 410, the search list update unit 702 places the least recently used page size tag 410 at the head of the search list. The process continues at block 806.

At block 806, a TLB set is chosen based on fields associated with the address being resolved. For example, the search list unit 704 transmits a page size tag 410 to the shift unit 518. The shift unit 518 also receives the index 418. Based on the page size tag 410, the shift unit 518 configures the index 418 to a size corresponding to the current page size. The shift unit 518 transmits the configured index 418 to the hash unit 520, which receives a global ID 412 and an ASID 414. The hash unit 520 uses the global ID 412, ASID 414, and index 418 to select a set in way 0 (and the other ways) of the TLB 208. The process continues at block 808.

At block 808, it is determined whether the page size tag is less than or equal to the current page size. For example, in one embodiment, the comparator 708 receives the current page size from the page size encoder 510, while also receiving from a page size tag 410 from the search list 704. The comparator 508 compares the current page size to the page size tag. If the page size tag 410 is less than or equal to the current page size, the process continues at block 810. Otherwise, the process continues at block 812.

As shown in block 812, it is determined whether all entries in the search list have been used in the search. For example, the search list unit 704 determines whether it has used each of the different page size tags stored therein in the search for a TLB comparison tag that matches the comparison tag. If all the entries have been used, the process continues at block 814. Otherwise, the process continues at block 804.

As shown in block 814, a miss indication is generated. For example, the and-gate 502 generates a miss indication. In one embodiment, the miss indication indicates that the comparison tag did not match the TLB comparison tag and/or the page size tag 410 did not match the TLB page size tag 408 and/or the current page size is greater than the page size tag 410. The process continues at block 818.

At block 818, a TLB exception is generated. For example, the miss indication causes logic (not shown) in the processor 102 to generate a TLB exception. Operations for responding to a TLB exception are described below in the discussion of FIG. 9. From block 818, the process ends.

At block 810, it is determined whether the TLB page size tag and TLB comparison tag match the page size tag and comparison tag, respectively. For example, the comparator 506 compares the TLB page size tag 408 with the page size tag 410. Also, the comparator 504 compares the TLB comparison tag with the comparison tag. If the tags match, the process continues at block 816. Otherwise, the process continues at block 808.

As shown in block 816, the page frame number stored in the TLB entry is transmitted to predetermined storage location and a hit indication is generated. For example, the TLB 208 transmits the page frame number 212 to a predetermined storage location. In one embodiment, the predetermined storage location is a load/store unit (not shown) inside the processor(s) 102. Additionally, the and-gate 502 generates a hit indication. In one embodiment, the hit indication indicates that the comparison tag matched the TLB comparison tag, the page size tag 410 matched the TLB page size tag 408, and the current page size is greater than the page size tag 410. From block 816, the process ends.

Figure 9:
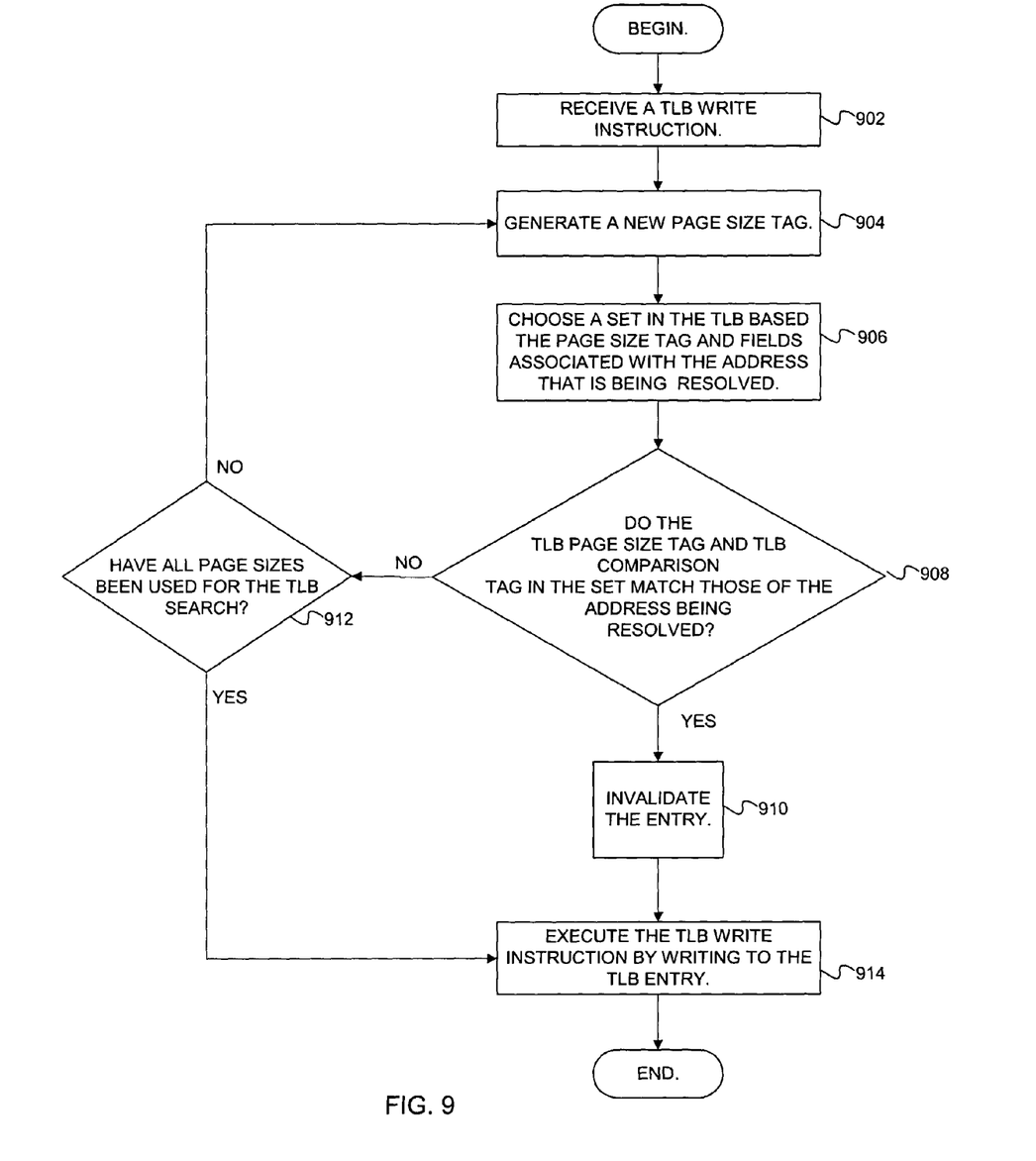
FIG 9 is a flow diagram illustrating operations for processing a TLB exception, according to embodiments of the invention.

The discussion of FIGS. 6-8 above describes logic and operations for reading an entry from the TLB, while FIG. 9 describes operations for writing address mapping information to a TLB entry following a TLB miss.

FIG. 9 is a flow diagram illustrating operations for processing a TLB exception, according to embodiments of the invention. The flow diagram will be described with reference to the exemplary embodiments of FIGS. 1 and 7. As described above, a TLB exception is generated when a virtual address cannot be resolved using the contents of the TLB (e.g., when a comparison tag does not match any of the TLB comparison tags). To resolve the virtual memory address after the TLB exception, processor logic must fetch the necessary address mapping information from the page table. The flow diagram 900 commences at block 902.

At block 902, a TLB write instruction is received. For example, the processor(s) 102 receives a write instruction. The process continues at block 904.

As shown in block 904, a new page tag is generated. For example, the search list unit 704 generates a new page size tag. In alternative embodiment, the page size encoder 510, mod N counter 514, and exclusive-or gate 516 generate a new page size tag. The process continues at block 906.

At block 906, a set in the TLB is chosen based on the page size tag and fields associated with the address that is being resolved. For example, the exclusive-or gate 516 transmits the page size tag 410 to the shift unit 518. The shift unit 518 also receives the page size tag 408 and the index 418. Based on the page size tag 410, the shift unit 518 configures the index 418 to a size corresponding to the current page size. The shift unit 518 transmits the configured index 418 to the hash unit 520, which also receives a global ID 412 and an ASID 414. The hash unit 520 uses the global ID 412, ASID 414, and index 418 to choose a set in way 0 (and other ways) of the TLB 208. The process continues at block 908.

At block 908, it is determined whether the TLB page size tag and TLB comparison tag match the page size tag and comparison tag, respectively. For example, the comparator 506 compares the TLB page size tag 408 with the page size tag 410. Also, the comparator 504 compares the TLB comparison tag with the comparison tag. If the tags match, the process continues at block 910. Otherwise, the process continues at block 912.

As shown in block 910, the entry containing the matching tags is invalidated. For example, in one embodiment, the entrys invalid field (not shown) is marked to indicate that the entry is invalid. The process continues at block 914.

At block 914, the TLB write instruction is executed. For example, executing the TLB write instruction causes virtual address mapping information is written to a TLB entry. For example, a page frame number 212, TLB page size tag 410, TLB global 406, TLB ASID 404, etc. are written to a TLB entry. In one embodiment, the TLB entry is chosen according to an eviction policy such as LRU. Alternative embodiments use other suitable eviction policies.

At block 912, it is determined whether all page sizes have been used in the TLB search. For example, the mod N counter 514 determines whether a page size tag 410 corresponding to each of the supported page sizes has been used to search the TLB 208 for a TLB comparison tag that matches the comparison tag. If all page sizes have been used in the search, the process continues at block 904. Otherwise the process continues at block 914.

Thus, a system and method for resolving virtual addresses using a page size tag. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:
1. A method comprising:
  translating a virtual memory address into a physical memory address, the translating including,
    creating a first page size tag;
    choosing an entry in a translation lookaside buffer, wherein the entry stores a second page size tag and a page frame number;
    comparing the first page size tag with the second page size tag;
    if the first page size tag is equal to the second page size tag, using the page frame number to form the physical memory address, and
    if the first page size tag is greater then the second page size tag, generating a miss indication.

2. The method of claim 1, wherein the translation lookaside buffer is N-way set associative.

3. The method of claim 1, wherein the translation lookaside buffer is a second level translation lookaside buffer.

4. The method of claim 1, wherein the page size tag is represented in a 4-bit string.

5. A method comprising:
searching a translation lookaside buffer (TLB) to resolve a virtual memory address, wherein the TLB includes a plurality of entries, and wherein one or more of the entries include a TLB page size tag and a page frame number, the searching including,
comparing a first page size tag with the TLB page size tag of an entry in the TLB, wherein the first page size tag is selected from a search order list; and
after determining the first page size tag is less than or equal to the TLB page size tag, writing the page frame number to a predetermined memory location;
after determining the page size tag is greater than to the TLB page size comparing a second page size tag with the TLB page size tag of the entry, wherein the second page size tag is selected from the search order list.

6. The method of claim 5, wherein the translating further includes, after determining the page size tag is greater than the TLB page size tag, generating a miss indication.

7. The method of claim 5, wherein the translation lookaside buffer is N-way set associative.

8. The method of claim 5, wherein the translation lookaside buffer is a second level translation lookaside buffer.

9. The method of claim 5, wherein the page size tag is represented in a 4-bit string.

10. An apparatus comprising:
a translation lookaside buffer (TLB), the TLB including a plurality of entries, the entries including,
a TLB page size tag field; and
a page frame number field;
a search list unit to transmit a page size tag based on a search list, wherein the search list unit is updated according to a least recently used policy;
a selection logic to select an entry of the plurality of entries based on the page size tag; and
a comparator to compare the page size tag with the contents of the TLB page size tag field of the selected entry.

11. The apparatus of claim 10, wherein the comparator generates a hit indication if the page size tag matches the contents of the TLB page size tag field.

12. The apparatus of claim 10, wherein the TLB is a second-level N-way set associative TLB.

13. An apparatus comprising:
a translation lookaside buffer (TLB), the TLB including a plurality of entries, the entries including,
a TLB page size tag field; and
a page frame number field;
a search list unit to transmit a page size tag based on a search list;
a selection logic to select an entry of the plurality of entries based on the page size tag; and
a comparator to compare the page size tag with the contents of the TLB page size tag field of the selected entry, wherein the comparator generates a miss indication if the page size tag is greater than the contents of the TLB page size tag field.

14. The apparatus of claim 13, wherein the TLB is a second-level N-way set associative TLB.

15. The apparatus of claim 13, wherein the comparator generates a hit indication if the page size tag matches the contents of the TLB page size tag field.

* * * * *

UNITED STATES PATENT AND TRADEMARK OFFICE
CERTIFICATE OF CORRECTION

PATENT NO. : 7,089,398 B2 Page 1 of 1
APPLICATION NO. : 10/632131
DATED : August 8, 2006
INVENTOR(S) : Zhang It is certified that error appears in the above-identified patent and that said Letters Patent is hereby corrected as shown below:

On the Title page, in item (73), in "Assignee", in column 1, line 2, after "CA" insert -- 94043 --.

On the Title page, in item (57), under "Abstract", in column 2, line 3, after "into" insert -- a --.

Column 10, line 66, in Claim 1, delete "then" and insert -- than --, therefor.

Signed and Sealed this

Sixth Day of March, 2007

JON W. DUDAS
*Director of the United States Patent and Trademark Office*